United States Patent
Wada

(10) Patent No.: US 10,015,352 B2
(45) Date of Patent: Jul. 3, 2018

(54) EXPOSURE DEVICE HAVING A PLURALITY OF FIRST AND SECOND LIGHT EMITTING ELEMENTS, LED HEAD AS THE EXPOSURE DEVICE, IMAGE FORMING APPARATUS INCLUDING THE EXPOSURE DEVICE, AND IMAGE READING APPARATUS

(71) Applicant: Oki Data Corporation, Tokyo (JP)

(72) Inventor: Keisuke Wada, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 15/379,930

(22) Filed: Dec. 15, 2016

(65) Prior Publication Data

US 2017/0289385 A1    Oct. 5, 2017

(30) Foreign Application Priority Data

Mar. 30, 2016   (JP) .................................. 2016-067030

(51) Int. Cl.
   *H04N 1/028*      (2006.01)
   *G03G 15/04*      (2006.01)
(52) U.S. Cl.
   CPC ... *H04N 1/02865* (2013.01); *G03G 15/04036* (2013.01); *H04N 2201/0081* (2013.01)
(58) Field of Classification Search
   None
   See application file for complete search history.

(56) References Cited

U.S. PATENT DOCUMENTS

2007/0070166 A1    3/2007   Mikami et al.

FOREIGN PATENT DOCUMENTS

| EP | 1238805 A1 | | 9/2002 |
|----|---|---|---|
| EP | 2481597 A1 | | 8/2012 |
| JP | 2004-209992 A | | 7/2004 |
| JP | 2006205387 A | * | 8/2006 |

* cited by examiner

*Primary Examiner* — Thomas D Lee
(74) *Attorney, Agent, or Firm* — Rabin & Berdo, P.C.

(57) ABSTRACT

An exposure device includes a first light emitting element substrate including a plurality of first light emitting elements arranged at an arrangement interval T in a longitudinal direction, and a second light emitting element substrate including a part in the longitudinal direction that overlaps with a part of the first light receiving element substrate so as to form an overlapping region. The first and second light emitting element substrates are shifted from each other in a direction perpendicular to the longitudinal direction. The second light emitting element substrate includes a plurality of second light emitting elements arranged in the longitudinal direction. The second light emitting elements are arranged at the arrangement interval T at least outside the overlapping region. When an interval between two of the second light emitting elements of the second light emitting element substrate disposed in the overlapping region is expressed as a specified interval TS, the specified interval TS and the arrangement interval T satisfy:

T≤TS≤2T.

15 Claims, 9 Drawing Sheets

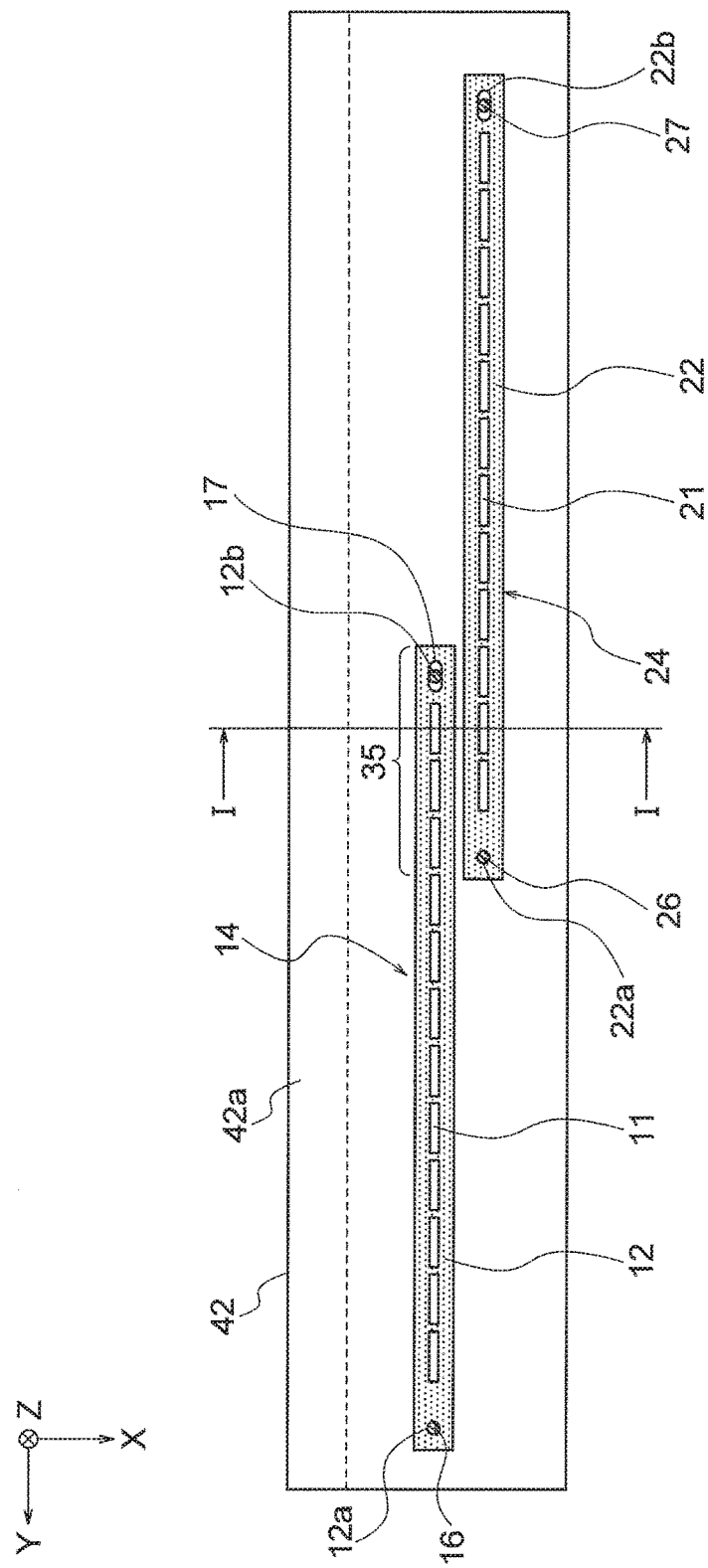

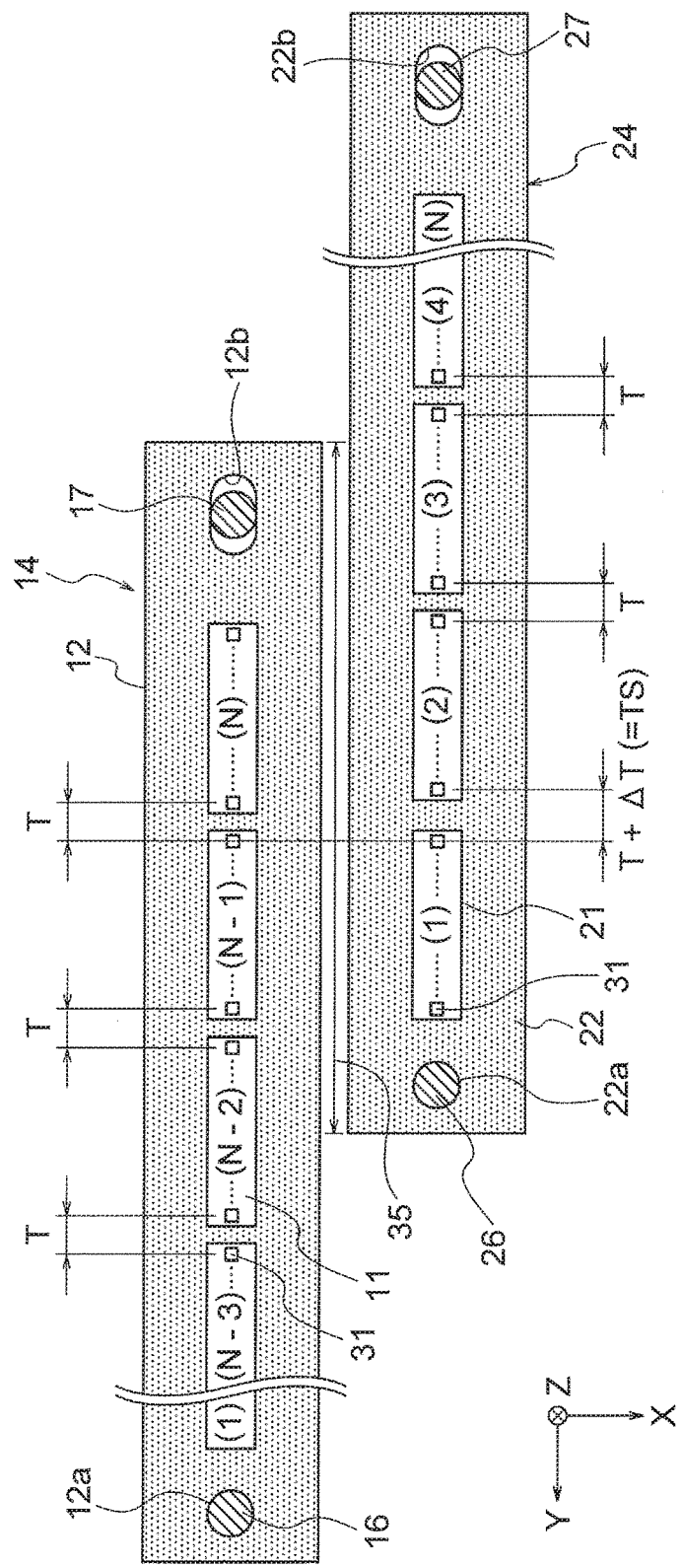

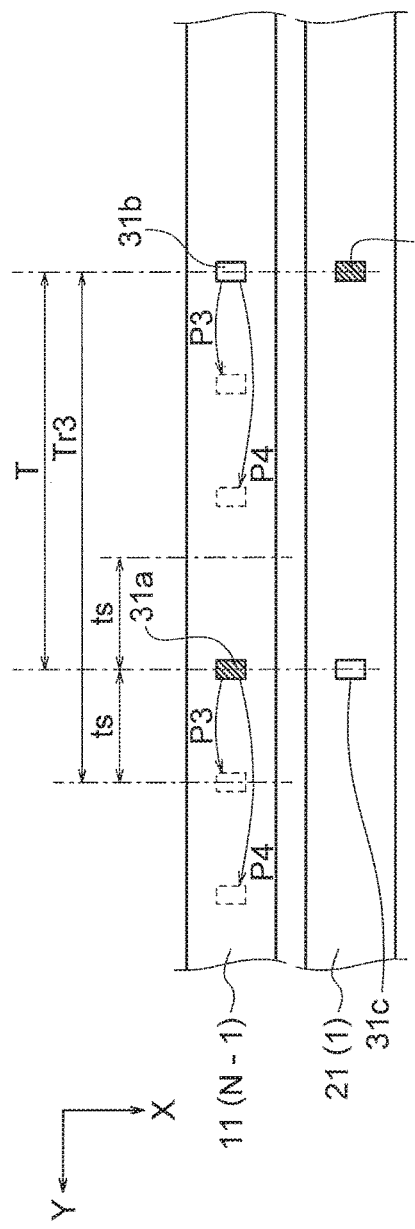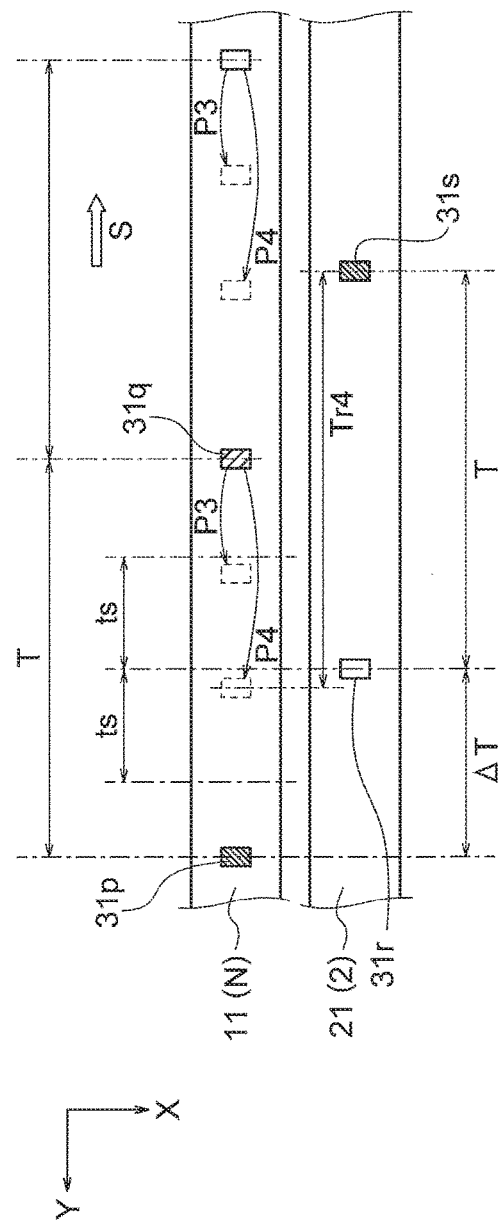
FIG. 5A
FIG. 5B

EXPOSURE DEVICE HAVING A PLURALITY OF FIRST AND SECOND LIGHT EMITTING ELEMENTS, LED HEAD AS THE EXPOSURE DEVICE, IMAGE FORMING APPARATUS INCLUDING THE EXPOSURE DEVICE, AND IMAGE READING APPARATUS

BACKGROUND OF THE INVENTION

The present invention relates an exposure device including light emitting elements, an LED head including LEDs, an image forming apparatus including the exposure device, and an image reading apparatus.

An exposure device includes a plurality of LED (Light Emitting Diode) arrays each of which includes a plurality of LEDs linearly arranged in a scanning direction. The LED arrays are arranged in at least two rows in a staggered manner. An interval in the scanning direction between the endmost LEDs of the adjacent LED arrays of the different rows is set to be the same as an interval between the adjacent LEDs of the same LED array. Such an exposure device is disclosed in, for example, Japanese Patent Application Publication No. 2004-209992 (see Page 4, FIG. 2).

However, in the general exposure device, the LED arrays may expand or contract due to changes in temperature and humidity. Therefore, it is difficult to manage the interval in the scanning direction between the endmost LEDs of the adjacent LED arrays of the different rows within an allowable range. Therefore, exposure accuracy or image reading accuracy may be lowered. As a result, printing quality or reading quality may be lowered.

SUMMARY OF THE INVENTION

An aspect of the present invention is intended to enhance exposure accuracy or image reading accuracy.

According to an aspect of the present invention, there is provided an exposure device including a first light emitting element substrate including a plurality of first light emitting elements arranged at an arrangement interval T in a longitudinal direction of the first light emitting element substrate, and a second light emitting element substrate including a part in the longitudinal direction that overlaps with a part of the first light emitting element substrate so as to form an overlapping region. The first light emitting element substrate and the second light emitting element substrate are shifted from each other in a direction perpendicular to the longitudinal direction. The second light emitting element substrate includes a plurality of second light emitting elements arranged in the longitudinal direction. The second light emitting elements are arranged at the arrangement interval T at least outside the overlapping region. When an interval between two of the second light emitting elements of the second light emitting element substrate disposed in the overlapping region is expressed as a specified interval TS, the specified interval TS and the arrangement interval T satisfy the following relationship:

$$T \leq TS \leq 2T.$$

With such a configuration, an interval between the light emitting elements that emit light can be controlled within an allowable range, even when a positional relationship between the adjacent light emitting element substrates changes in the longitudinal direction.

BRIEF DESCRIPTION OF THE DRAWINGS

In the attached drawings:

FIG. 2 is a plan view showing the exposure device;

FIG. 3 is an enlarged plan view showing an overlapping portion in which a first LED array substrate and a second LED substrate of the exposure device overlap with each other;

FIG. 5A is a schematic view showing a positional relationship between the LEDs of the LED array numbered "N-1" of the first LED array substrate and the LEDs of the LED array numbered "1" of the second LED array substrate;

FIG. 5B is a schematic view showing a positional relationship between the LEDs of the LED array numbered "N" of the first LED array substrate and the LEDs of the LED array numbered "1" of the second LED array substrate;

DETAILED DESCRIPTION OF THE PREFERRED EMBODIMENT

Embodiment 1.

Figure 1:
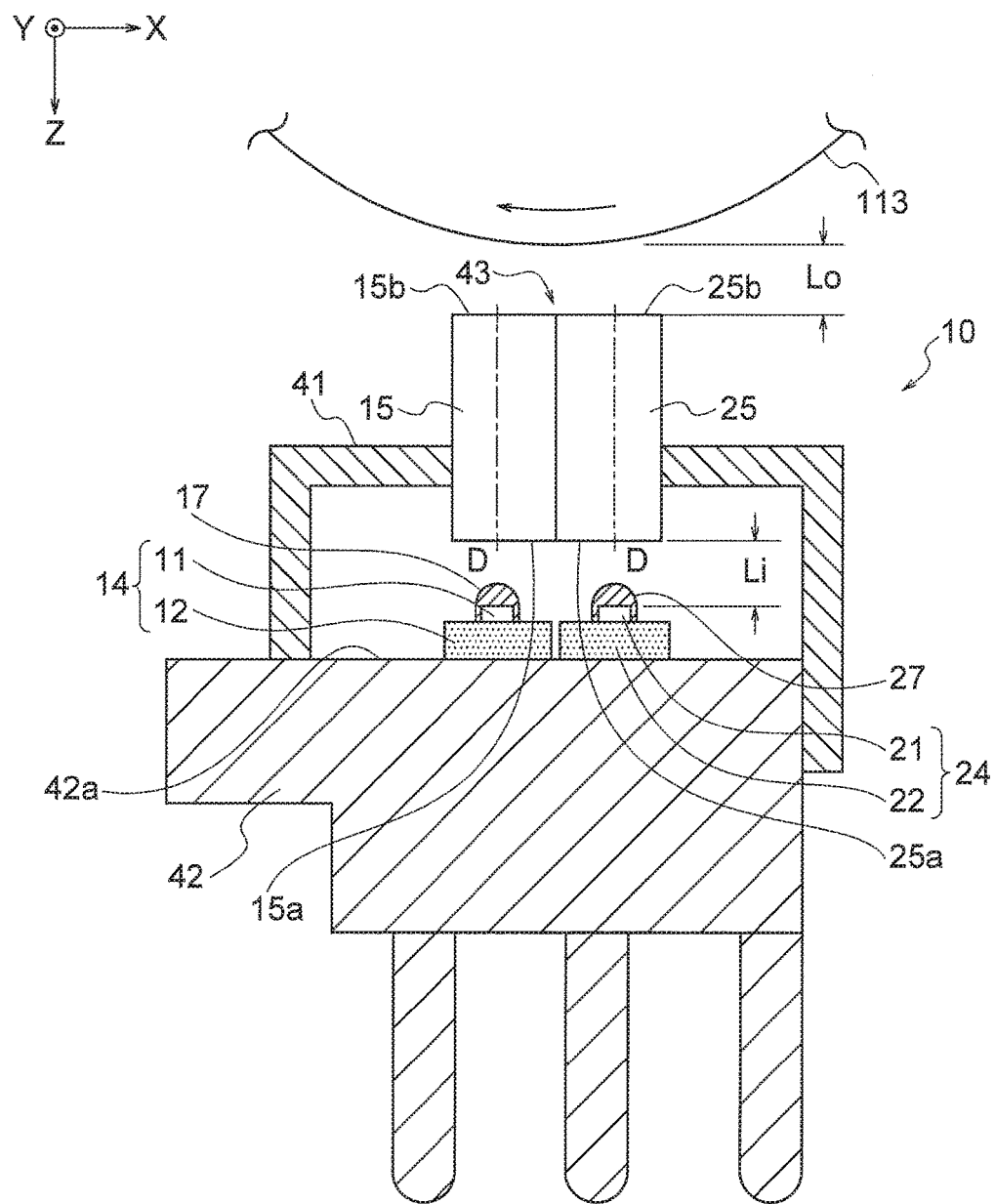
FIG. 1 is a sectional view showing a configuration of an exposure device according to Embodiment 1 of the present invention.

FIG. 1 is a sectional view showing a configuration of an exposure device 10 according to Embodiment 1 of the present invention. FIG. 2 is a plan view showing the exposure device 10. FIG. 1 corresponds to a sectional view taken along line I-I in FIG. 2.

As shown in FIGS. 1 and 2, the exposure device 10 includes a first LED array substrate 14, a second LED array substrate 24, a base plate 42 on which the first LED array substrate 14 and the second LED array substrate 24 are arranged, a rod lens 43, and a lens holder 41 provided on the base plate 42 and supporting the rod lens 43. The first LED array substrate 14 includes a substrate 12 having an elongated shape, and a plurality of LED arrays 11 linearly arranged on the substrate 12. The second LED array substrate 24 includes a substrate 22 having an elongated shape, and a plurality of LED arrays 21 linearly arranged on the substrate 22. The base plate 42 holds the first LED array substrate 14 and the second LED array substrate 24 so that the first LED array substrate 14 and the second LED array substrate 24 are arranged in a staggered manner. The rod lens 43 includes a first rod lens array 15 focusing light emitted by the LED arrays 11 of the first LED array substrate 14, and a second rod lens array 25 focusing light emitted by the LED arrays 21 of the second LED array substrate 24. The base plate 42 supports the rod lens 43 at a predetermined distance from the LED arrays 11 and 21. The lens holder 41, the first rod lens array 15, and the second rod lens array 25 are omitted in FIG. 2.

In this regard, an X-axis direction, a Y-axis direction and a Z-axis direction are defined as shown in FIG. 1. To be more specific, the Y-axis direction is defined as being parallel to a longitudinal direction of the exposure device 10. The X-axis direction is defined as being parallel to a mounting surface 42a of the base plate 42, and being parallel to a widthwise direction of the exposure device 10. The Z-axis direction is defined as being perpendicular to both of the X-axis direction and the Y-axis direction. In other figures, the X-axis direction, the Y-axis direction and the Z-axis direction respectively indicate directions which are the same as those in FIG. 1. Optical axes D of the rod lens arrays 15 and 25 are oriented in the Z-axis direction.

The first LED array substrate 14 as a first light emitting element substrate is disposed on the mounting surface 42a of the base plate 42 as a base. The second LED array substrate 24 as a second light emitting element substrate is disposed on the mounting surface 42a of the base plate 42. The first LED array substrate 14 and the second LED array substrate 24 both extend in a longitudinal direction of the base plate 42 (i.e., the Y-axis direction). The first LED array substrate 14 and the second LED array substrate 24 are arranged in a staggered manner. The exposure device 10 may include a plurality of the first LED array substrate 14 and a plurality of the second LED substrate 24. As shown in FIG. 2, an end portion of the first LED array substrate 14 and an end portion of the second LED array substrate 24 face each other in parallel, and overlap each other in a widthwise direction of the base plate 42 (i.e., the X-axis direction). The end portions of the first LED array substrate 14 and the second LED array substrate 24 are referred to as an overlapping region 35.

For this purpose, a positioning circular hole 12a is formed on an end portion (i.e., a first end portion) of the substrate 12 of the first LED array substrate 14, and a positioning elongated hole 12b is formed on the other end portion (i.e., a second end portion) of the substrate 12. A positioning circular hole 22a is formed on an end portion (i.e., a first end portion) of the substrate 22 of the second LED array substrate 24, and a positioning elongated hole 22b is formed on the other end portion (i.e., a second end portion) of the substrate 22. Positioning pins 16, 17, 26 and 27 are disposed on the mounting surface 42a of the base plate 42. The positioning pin 16 engages the positioning circular hole 12a of the first LED array substrate 14. The positioning pin 17 engages the positioning elongated hole 12b of the first LED array substrate 14. The positioning pin 26 engages the positioning circular hole 22a of the second LED array substrate 24. The positioning pin 27 engages the positioning elongated hole 22b of the second LED array substrate 24.

By engagements between the positioning circular hole 12a and the positioning pin 16, the positioning elongated hole 12b and the positioning pin 17, the positioning circular hole 22a and the positioning pin 26, and the positioning elongated hole 22b and the positioning pin 27, the first LED array substrate 14 and the second LED array substrate 24 are positioned on the mounting surface 42a of the base plate 42 in a scanning direction (i.e., the longitudinal direction) in the staggered manner. The scanning direction is also referred to as a main scanning direction. The end portion of the first LED array substrate 14 on which the positioning elongated hole 12b is formed and the end portion of the second LED array substrate 24 on which the positioning circular hole 22a is formed are arranged so as to form the overlapping region 35.

FIG. 3 is an enlarged view showing a part including the overlapping region 35 of the first LED array substrate 14 and the second LED array substrate 24 positioned on the mounting surface 42a of the base plate 42 by the above described engagements. The base plate 42 is omitted in FIG. 3. Arrangement of the first LED array substrate 14 and the second LED array substrate 24 will be described with reference to FIG. 3.

Here, the substrates 12 and 22 of the first LED array substrate 14 and the second LED array substrate 24 have the same configurations. The LED arrays 11 and 21 of the first LED array substrate 14 and the second LED array substrate 24 have the same configurations. The first LED array substrate 14 and the second LED array substrate 24 are different from each other in arrangement of the LED arrays 11 and 21.

The first LED array substrate 14 includes the N LED arrays 11 which are numbered "1" through "N" from the positioning circular hole 12a side (i.e., a positive side in the Y-axis direction) of the substrate 12. The LED arrays 11 numbered "1" through "N" are arranged in the scanning direction at a predetermined interval on a mounting surface of the substrate 12.

Each LED array 11 includes a plurality of LEDs 31 (i.e., light emitting elements or first light emitting elements) arranged in the longitudinal direction (i.e., the scanning direction) at an interval T (i.e., an arrangement interval). Here, a positive Y-axis direction is referred to as "front" and a negative Y-axis direction is referred to "rear". The interval T (FIG. 3) between any two LED arrays 11 adjacent to each other in the Y-axis direction (i.e., front-rear direction) is set to be the same as a distance between the rearmost LED 31 of the frontward LED array 11 (i.e., the LED array 11 numbered a smaller number) and the frontmost LED 31 of the rearward LED array 11 (i.e., the LED array 11 numbered a larger number). Hereinafter, the "interval between the LED arrays" indicates the distance between the rearmost LED 31 of the frontward LED array 11 and the frontmost LED 31 of the rearward LED array 11 (adjacent to the frontward LED array 11 in the Y-axis direction).

Further, the LED arrays 11 are mounted on the mounting surface of the substrate 12 by an LED mounting apparatus (for example, a dice bonder) having a sufficient mounting accuracy, and are arranged in the scanning direction at the interval T corresponding to a resolution of pixels. This interval T is the same as the distance between the adjacent LEDs on the same substrate 12. For example, when the exposure device 10 has a resolution of 1200 dpi, the interval T is 21.2 μm, and an allowable error of the interval T is ±6 μm.

The second LED array substrate 24 includes the N LED arrays 21 which are numbered "1" to "N" from the positioning circular hole 22a side (i.e., a positive side in the Y-axis direction) of the substrate 22. The LED arrays 21 numbered "1" through "N" are arranged in the scanning direction at a predetermined interval T or T+ΔT on a mounting surface of the substrate 22. To be more specific, the interval between the LED array 21 numbered "1" and the LED array 21 numbered "2" is T+ΔT. The LED arrays 21 numbered "2" through "N" are arranged at the interval T, which is the same as the interval T of the LED arrays 11 of the first LED array substrate 14. That is, the LEDs 31 of the second LED array substrate 24 are arranged at the interval T at least outside the overlapping region 35.

The first LED array substrate 14 and the second LED array substrate 24 configured as above are fixed to the mounting surface 42*a* of the base plate 42, and are arranged in a staggered manner (i.e., in a manner in which the first LED array substrate 14 and the second LED array substrate 24 are shifted from each other in the widthwise direction). The first LED array substrate 14 is substantially positioned and placed on the mounting surface 42*a* of the base plate 42 in such a manner that the positioning circular hole 12*a* engages the positioning pin 16 and the positioning elongated hole 12*b* engages the positioning pin 17. Similarly, the second LED array substrate 24 is substantially positioned and placed on the mounting surface 42*a* of the base plate 42 in such a manner that the positioning circular hole 22*a* engages the positioning pin 26 and the positioning elongated hole 22*b* engages the positioning pin 27.

The first LED array substrate 14 and the second LED array substrate 24 are arranged in the staggered manner as shown in FIGS. 2 and 3. In the overlapping region 35, the LED array 11 numbered "N-1" of the first LED array substrate 14 and the LED array 21 numbered "1" of the second LED array substrate 24 face each other in the widthwise direction (i.e., the X-axis direction). Further, in the overlapping region 35, the LED array 11 numbered "N" of the first LED array substrate 14 and the LED array 21 numbered "2" of the second LED array substrate 24 face each other in the widthwise direction (i.e., the X-axis direction).

The first LED array substrate 14 and the second LED array substrate 24 are fixed to the base plate 42 (FIG. 2) using a fixing screw, an adhesive agent or the like. When the first LED array substrate 14 and the second LED array substrate 24 are fixed to the base plate 42, the first LED array substrate 14 and the second LED array substrate 24 are adjusted so that the LED array 11 numbered "N-1" of the first LED array substrate 14 and the LED array 21 numbered "1" of the second LED array substrate 24 face each other in the widthwise direction (i.e., the X-axis direction) as accurately as possible.

Therefore, the LEDs 31 of the LED array 21 numbered "2" of the second LED array substrate 24 are displaced in the scanning direction relative to the LEDs 31 of the LED array 11 numbered "N" of the first LED array substrate 14 by a displacement amount ΔT. As described later, the displacement amount ΔT is set to be smaller than or equal to 10 μm.

In the exposure device 10 shown in FIG. 1, the first LED array substrate 14 and the second LED array substrate 24 configured as above are disposed on the mounting surface 42*a* of the base plate 42 in a predetermined positional relationship. In this regard, FIG. 1 shows an example in which the exposure device 10 is mounted in an image forming apparatus and is disposed so as to face a photosensitive drum 113.

As shown in FIG. 1, the first rod lens array 15 focuses light emitted from the LED arrays 11 of the first LED array substrate 14 on a surface of the photosensitive drum 113. The first rod lens array 15 is disposed so as to face the linearly arranged LED arrays 11 of the first LED array substrate 14. The first rod lens array 15 has incident surfaces 15*a* (on which light is incident) facing the LED arrays 11. The first rod lens array 15 is held by the lens holder 41 so that a distance Li (i.e., an incident distance) between a surface of each LED array 11 and the incident surface 15*a* of the first rod lens array 15 is a certain distance.

Similarly, the second rod lens array 25 focuses light emitted from the LED arrays 21 of the second LED array substrate 24 on the surface of the photosensitive drum 113. The second rod lens array 25 is disposed so as to face the linearly arranged LED arrays 21 of the second LED array substrate 24. The second rod lens array 25 has incident surfaces 25*a* (on which light is incident) facing the LED arrays 21. The second rod lens array 25 is held by the lens holder 41 so that a distance Li (i.e., an incident distance) between a surface of each LED array 21 and the incident surface 25*a* of the second rod lens array 25 is a certain distance.

Further, the first rod lens array 15 and the second rod lens array 25 are fixed to the lens holder 41 at positions where the incidence distance Li is an optimal distance in terms of characteristics of each rod lens array. In this example, the exposure device 10 is fixed to the image forming apparatus so that a distance Lo (i.e., an emission distance) between each of emission surfaces of the first rod lens array 15 and the second rod lens array 25 and the surface of the photosensitive drum 113 is the same as the incident distance Li (Li=Lo).

Figures 4A, 4B:
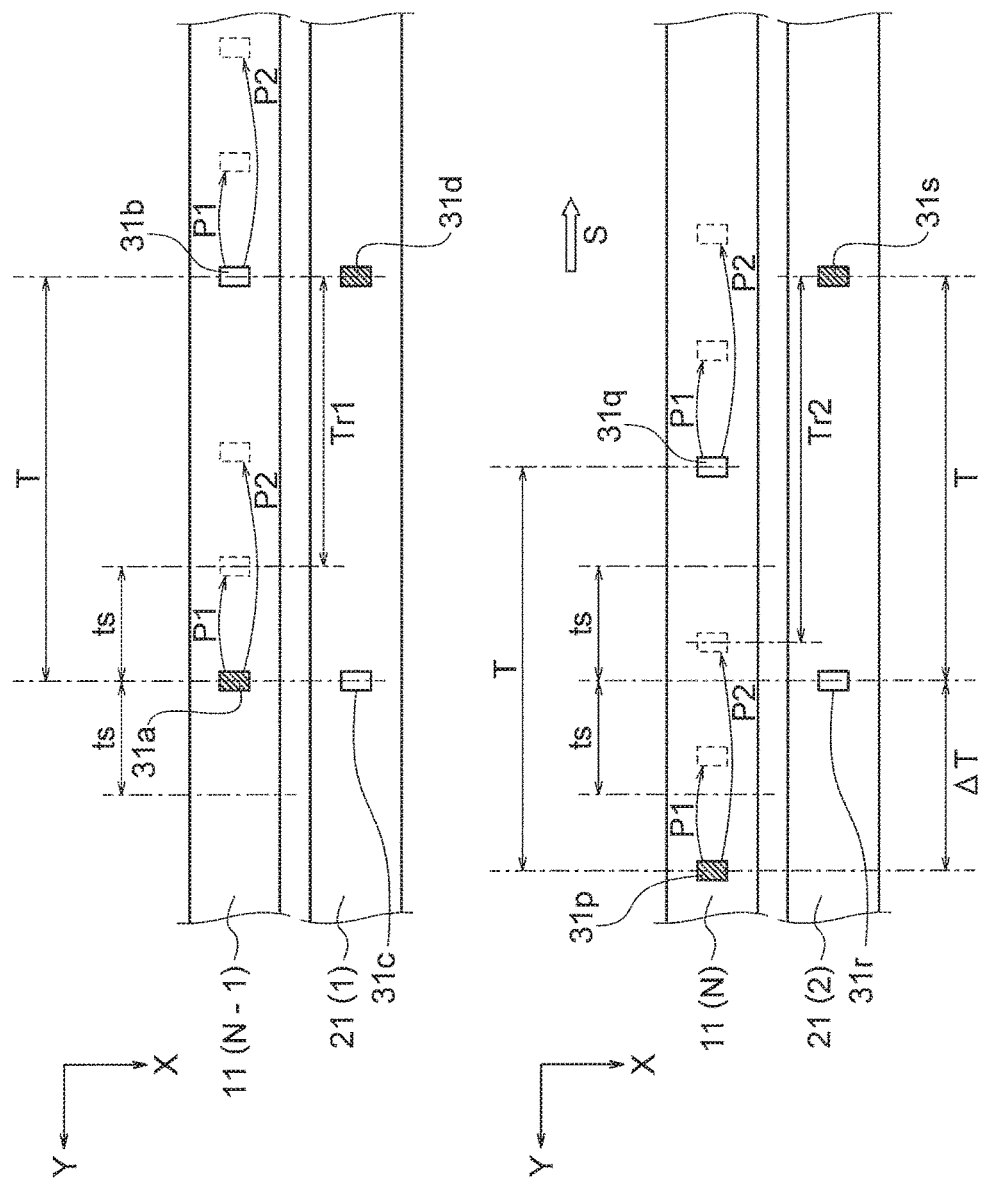
FIG. 4A is a schematic view showing a positional relationship between LEDs of an LED array numbered "N-1" of the first LED array substrate and LEDs of an LED array numbered "1" of the second LED array substrate.
FIG. 4B is a schematic view showing a positional relationship between LEDs of an LED array numbered "N" of the first LED array substrate and LEDs of an LED array numbered "2" of the second LED array substrate.

FIGS. 4A and 4B are schematic views showing a positional relationship between the LEDs 31 of the first LED array substrate 14 and the LEDs 31 of the second LED array substrate 24 shown in FIG. 3. To be more specific, FIG. 4A shows a positional relationship between the LEDs 31 of the LED array 11 numbered "N-1" of the first LED array substrate 14 and the LEDs 31 of the LED array 21 numbered "1" of the second LED array substrate 24. FIG. 4B shows a positional relationship between the LEDs 31 of the LED array 11 numbered "N" of the first LED array substrate 14 and the LEDs 31 of the LED array 21 numbered "2" of the second LED array substrate 24.

As shown in FIG. 4A, the LEDs 31*a* and 31*b* of the LED array 11 numbered "N-1" of the first LED array substrate 14 and the LEDs 31*c* and 31*d* of the LED array 21 numbered "1" of the second LED array substrate 24 are respectively aligned in the widthwise direction (i.e., the X-axis direction). In contrast, as shown in FIG. 4B, the LEDs 31*r* and 31*s* of the LED array 21 numbered "2" of the second LED array substrate 24 are displaced in the scanning direction shown by an arrow S (i.e., the negative Y-axis direction) relative to the LEDs 31*p* and 31*q* of the LED array 11 numbered "N" of the first LED array substrate 14 by a displacement amount ΔT.

In this regard, the displacement amount ΔT is set to be smaller than the interval T between the LEDs. In other words, the following relationship is satisfied:

$$0 \leq \Delta T < T$$

That is, in the second LED array substrate 24 shown in FIG. 3, an interval (i.e., a specified interval) between the LED array 21 numbered "1" and the LED array 21 numbered "2" is expressed as TS (=T+ΔT). The interval T and the interval TS are set so as to satisfy the following relationship:

$$T \leq TS \leq 2T$$

Consideration will be given to a case where the first LED array substrate 14 shown in FIG. 3 is displaced in the scanning direction (i.e., the negative Y-axis direction) relative to the second LED array substrate 24 due to expansion, contraction or mounting error of the substrate 12, and generates a displacement error P.

In this case, as shown in FIGS. 4A and 4B, the LEDs 31*a* and 31*b* of the LED array 11 of the first LED array substrate 14 are displaced in the scanning direction relative to the LEDs 31c and 31d of the LED array 21 of the second LED array substrate 24 as shown by broken lines by an error amount P1 or P2.

During scanning by the LEDs 31, light emission is switched between the first LED array substrate 14 and the second LED array substrate 24. With respect to the interval T, an allowable error of an interval between the last LED 31 of the last LED array substrate 14 that emits light before switching and the first LED 31 of the second LED array substrate 24 that emits light after switching is expressed as an "allowable selected-LED interval error ±ts (μm)".

When the displacement error P between the first LED array substrate 14 and the second LED array substrate 24 is the error amount P1 smaller than the allowable selected-LED interval error ±ts (μm), light emission is switched from the LED 31a of the LED array 11 numbered "N-1" of the first LED array substrate 14 to the LED 31d of the LED array 21 numbered "1" of the second LED array substrate 24 as shown in FIG. 4A. In this regard, the LED 31d of the LED array 21 numbered "1" corresponds to the LED 31b which is next to the LED 31a of the LED array 11 numbered "N-1".

Therefore, an error of an interval (referred to as an actual interval) Tr1 between the LED 31a and the LED 31d in the scanning direction (i.e., the Y-axis direction) can be made smaller than the allowable selected-LED interval error ±ts (μm). The actual interval Tr1 is an interval between the LEDs 31 of the different LED array substrates between which light emission is switched.

In contrast, when the displacement error P between the first LED array substrate 14 and the second LED array substrate 24 is the error amount P2 larger than or equal to the allowable selected-LED interval error ±ts (μm), light emission is switched from the LED 31p of the LED array 11 numbered "N" of the first LED array substrate 14 to the LED 31s of the LED array 21 numbered "2" of the second LED array substrate 24 as shown in FIG. 4B. In this regard, the LED 31s of the LED array 21 numbered "2" corresponds to the LED 31q which is next to the LED 31p of the LED array 11 numbered "N".

Therefore, even when the displacement error P between the LED array substrates is the error amount P2 larger than or equal to the allowable selected-LED interval error ±ts (μm), an error of an interval (referred to as an actual interval) Tr2 between the LED 31p and the LED 31s in the scanning direction can be made smaller than the allowable selected-LED interval error ±ts (μm). The actual interval Tr2 is an interval between the LEDs 31 of the different LED array substrates between which light emission is switched.

In this regard, when the first LED array substrate 14 (FIG. 3) is displaced relative to the second LED array substrate 24 in the scanning direction (i.e., the negative Y-axis direction) to generate the displacement error P, the error of the actual interval Tr2 described with reference to FIG. 4B is made smaller than the allowable selected-LED interval error ±ts (μm) in the case where the displacement error P (i.e., the error amount P1 or P2) is within a range expressed by the following relationship (1):

$$(\Delta T - ts) \leq P \leq (\Delta T + ts) \tag{1}$$

Therefore, for example, when the allowable selected-LED interval error ±ts (μm) is ±6 μm and the displacement amount ΔT is 10 μm, it is necessary that the displacement error P is within the following range:

$$4 \text{ μm} \leq P \leq 16 \text{ μm}$$

Therefore, when the displacement error P is in a range from 4 μm to 6 μm, the actual intervals Tr1 and Tr2 are both smaller than the allowable selected-LED interval error ±ts (μm). In this case, it is possible to switch light emission between the LED 31a and the LED 31d shown in FIG. 4A, or switch light emission between the LED 31p and the LED 31s shown in FIG. 4B. In contrast, when the displacement error P is larger than 6 μm, it is necessary to switch light emission between the LED 31p and the LED 31s shown in FIG. 4B.

Further consideration will be given.

When "ts" is the same as ΔT (ts=ΔT), the relationship (1) will be expressed as follows:

$$0 \leq P \leq 2\Delta T = 2ts \tag{2}$$

For example, when the allowable selected-LED interval error ±ts (μm) is ±10 μm and the displacement amount ΔT is 10 μm, the displacement error P is within the following range:

$$0 \leq P \leq 20 \text{ μm}$$

Therefore, when the displacement error P is in a range from 0 to 10 μm, the above described actual intervals Tr1 and Tr2 are both smaller than the allowable selected-LED interval error ±ts (μm). In this case, it is possible to switch light emission between the LED 31a and the LED 31d shown in FIG. 4A, or switch light emission between the LED 31p and the LED 31s shown in FIG. 4B. In contrast, when the displacement error P is larger than 10 μm, it is necessary to switch light emission between the LED 31p and the LED 31s shown in FIG. 4B.

Next, consideration will be given to a case where the first LED array substrate 14 shown in FIG. 3 is displaced in a direction opposite to the scanning direction (i.e., the positive Y-axis direction) relative to the second LED array substrate 24 due to expansion, contraction or mounting error of the substrate 12, and generates a displacement error P.

FIGS. 5A and 5B are schematic views showing a positional relationship between the LEDs 31 of the first LED array substrate 14 and the LEDs 31 of second LED array substrate 24 shown in FIG. 3. To be more specific, FIG. 5A shows a positional relationship between the LEDs 31 of the LED array 11 numbered "N-1" of the first LED array substrate 14 and the LEDs 31 of the LED array 21 numbered "1" of the second LED array substrate 24. FIG. 5B shows a positional relationship between the LEDs 31 of the LED array 11 numbered "N" of the first LED array substrate 14 and the LEDs 31 of the LED array 21 numbered "2" of the second LED array substrate 24.

As shown in FIG. 5A, the LEDs 31a and 31b of the LED array 11 numbered "N-1" of the first LED array substrate 14 and the LEDs 31c and 31d of the LED array 21 numbered "1" of the second LED array substrate 24 are respectively aligned in the widthwise direction (i.e., the X-axis direction). In contrast, as shown in FIG. 5B, the LEDs 31r and 31s of the LED array 21 numbered "2" of the second LED array substrate 24 are displaced in the scanning direction shown by an arrow S (i.e., the negative Y-axis direction) relative to the LEDs 31p and 31q of the LED array 11 numbered "N" of the first LED array substrate 14 by a displacement amount ΔT.

In this state, as shown in FIGS. 5A and 5B, the LEDs 31a and 31b of the LED array 11 of the first LED array substrate 14 are displaced in the direction opposite to the scanning direction relative to the LEDs 31c and 31d of the LED array 21 of the second LED array substrate 24 as shown by broken lines by an error amount P3 or P4.

When the displacement error P between the first LED array substrate 14 and the second LED array substrate 24 is the error amount P3 smaller than the allowable selected-LED interval error ±ts (μm), light emission is switched from the LED 31a of the LED array 11 numbered "N-1" of the first LED array substrate 14 to the LED 31d of the LED array 21 numbered "1" of the second LED array substrate 24 as shown in FIG. 5A. In this regard, the LED 31d of the LED array 21 numbered "1" corresponds to the LED 31b which is next to the LED 31a of the LED array 11 numbered "N-1".

Therefore, an error of an interval (referred to as an actual interval) Tr3 between the LED 31a and the LED 31d in the scanning direction (i.e., the Y-axis direction) can be made smaller than the allowable selected-LED interval error ±ts (μm). The actual interval Tr3 is an interval between the LEDs 31 of the different LED array substrates between which light emission is switched.

In contrast, when the displacement error P between the first LED array substrate 14 and the second LED array substrate 24 is the error amount P4 larger than or equal to the allowable selected-LED interval error ±ts (μm), light emission is switched from the LED 31q (next to the LED 31p) of the LED array 11 numbered "N" of the first LED array substrate 14 to the LED 31s of the LED array 21 numbered "2" of the second LED array substrate 24 as shown in FIG. 5B. In this regard, the LED 31s of the LED array 21 numbered "2" corresponds to the LED 31q of the LED array 11 numbered "N". Therefore, as compared with the case shown in FIG. 4B, the number of the LEDs 31 that emit light in the LED array 11 numbered "N" of the first LED array substrate 14 increases by 1 in the scanning direction.

Therefore, even when the displacement error P between the LED array substrates is the error amount P4 larger than or equal to the allowable selected-LED interval error ±ts (μm), an error of an interval (referred to as an actual interval) Tr4 between the LED 31q and the LED 31s in the scanning direction can be made smaller than the allowable selected-LED interval error ±ts (μm). The actual interval Tr4 is an interval between the LEDs 31 of the different LED array substrates between which light emission is switched.

In this regard, when the first LED array substrate 14 (FIG. 3) is displaced relative to the second LED array substrate 24 in the direction opposite to the scanning direction (i.e., the positive Y-axis direction) to generate the displacement error P, the error of the actual interval Tr4 described with reference to FIG. 5B is made smaller than the allowable selected-LED interval error ±ts (μm) in the case where the displacement error P (i.e., the error amount P3 or P4) is within a range expressed by the following relationship (3):

$$(T-\Delta T)-ts \leq P \leq (T-\Delta T)+ts \quad (3)$$

Therefore, for example, when the interval T is 21.2 μm, the allowable selected-LED interval error ±ts (μm) is ±6 μm, and the displacement amount ΔT is 10 μm, it is necessary that the displacement error P is within the following range:

$$5.2 \ \mu m \leq P \leq 17.2 \ \mu m$$

Therefore, when the displacement error P is in a range from 5.2 μm to 6 μm, the actual intervals Tr3 and Tr4 are both smaller than the allowable selected-LED interval error ±ts (μm). In this case, it is possible to switch light emission between the LED 31a and the LED 31d shown in FIG. 5A, or switch light emission between the LED 31q and the LED 31s shown in FIG. 5B. In contrast, when the displacement error P is larger than 6 μm, it is necessary to switch light emission between the LED 31q and the LED 31s shown in FIG. 5B.

Further consideration will be given.

When "ts" is the same as ΔT (ts=ΔT), the relationship (3) will be expressed as follows:

$$T-2ts \leq P \leq T \quad (4)$$

For example, when the allowable selected-LED interval error ±ts (μm) is ±10 μm and the displacement amount ΔT is 10 μm, the displacement error P is expressed as follows:

$$1.2 \ \mu m \leq P \leq 21.2 \ \mu m$$

Therefore, assuming that ts=ΔT, and assuming that 2ΔT=T, both of the relationships (2) and (4) can be expressed as follows:

$$0 \leq P \leq T \ \mu m$$

Accordingly, whichever direction the displacement error P is generated, the actual interval Tr1, Tr2, Tr3 and Tr4 are smaller than the allowable selected-LED interval error ±ts (μm).

In this case, in the second LED array substrate 24 shown in FIG. 3, when the interval (T+ΔT) between the LED array 21 numbered "1" and the LED array 21 numbered "2" is TS (i.e., the specified interval), the following relationship is obtained:

$$TS=T+T/2$$

The above described consideration is given to the case where the displacement error P between the LED array substrates is smaller than or equal to the interval T of the LEDs. However, the same is repeated as the displacement error P increases by an integer multiple of the interval T. Therefore, in at least a region where the LED array 11 numbered "N-1" of the first LED array substrate 14 and the LED array 21 numbered "1" of the second LED array substrate 24 overlap each other in the widthwise direction, the actual intervals Tr1, Tr2, Tr3 and Tr4 can be smaller than the allowable selected-LED interval error ±ts.

Further, the displacement amount ΔT is described to be set to T/2 (i.e., 2 ΔT=T). However, there is a large possibility that the actual interval Tr1, Tr2, Tr3 and Tr4 are smaller than the allowable selected-LED interval error ±ts (ΔT) when the displacement amount ΔT is in a predetermined range. The displacement amount ΔT is preferably set in a range from T/3 to 2×T/3. As a result, the interval TS is preferably set in the following range:

$$T+T/3 \leq TS \leq T+2 \times T/3$$

In this regard, when the displacement amount ΔT (equal to the allowable selected-LED interval error ts) is larger than 10 μm, a vertical stripe may appear in a printed image. Therefore, the displacement amount ΔT is preferably set to be the smaller than or equal to 10 μm.

Although description has been made to an example where the interval T is set to 21.2 μm, the interval T is not limited to this value but may be arbitrarily set.

Figure 6:
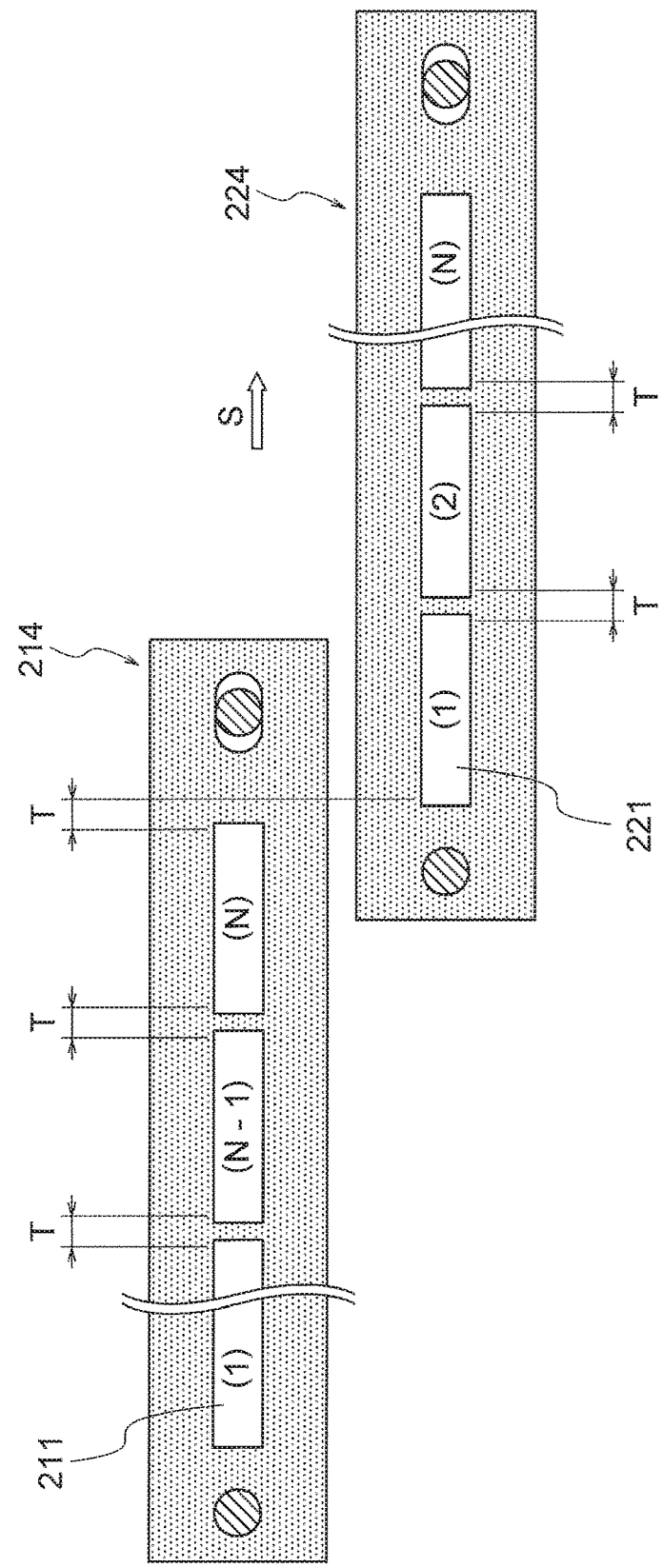
FIG. 6 is a schematic view showing a comparison example for comparison with the exposure device of Embodiment 1.

FIG. 6 shows a comparison example. In the comparison example, two LED array substrates 214 and 224 are arranged in a staggered manner on a base plate so that LED arrays 211 of the LED array substrates 214 and LED arrays 221 of the LED array substrates 214 do not overlap each other in a widthwise direction.

In the comparison example, the LED array substrates 214 and 224 are disposed so that a distance (in a scanning direction shown by an arrow S) between an endmost LED of the LED array 211 numbered "N" of the LED array substrate 214 in the scanning direction and an endmost LED of the LED array 221 numbered "1" of the LED array substrate 224 in the opposite direction becomes the same as an interval T between LEDs of the same LED array.

Therefore, a displacement error between the LED array substrates 214 and 224 in the scanning direction results in an error of the interval between the endmost LEDs of the LED array substrates 214 and 224. Therefore, the displacement error between the LED array substrates 214 and 224 needs to be smaller than the allowable selected-LED interval error ±ts. That is, the LED array substrates 214 and 224 are required to be mounted with very high accuracy.

As described above, according to the exposure device 10 of Embodiment 1, even when there is a displacement in the longitudinal direction between adjacent two LED array substrates arranged in a staggered manner, an error of the actual interval Tr between the adjacent endmost LEDs (light emitting elements) of the two LED array substrates can be made smaller than the allowable error.

Embodiment 2.

Figure 7:
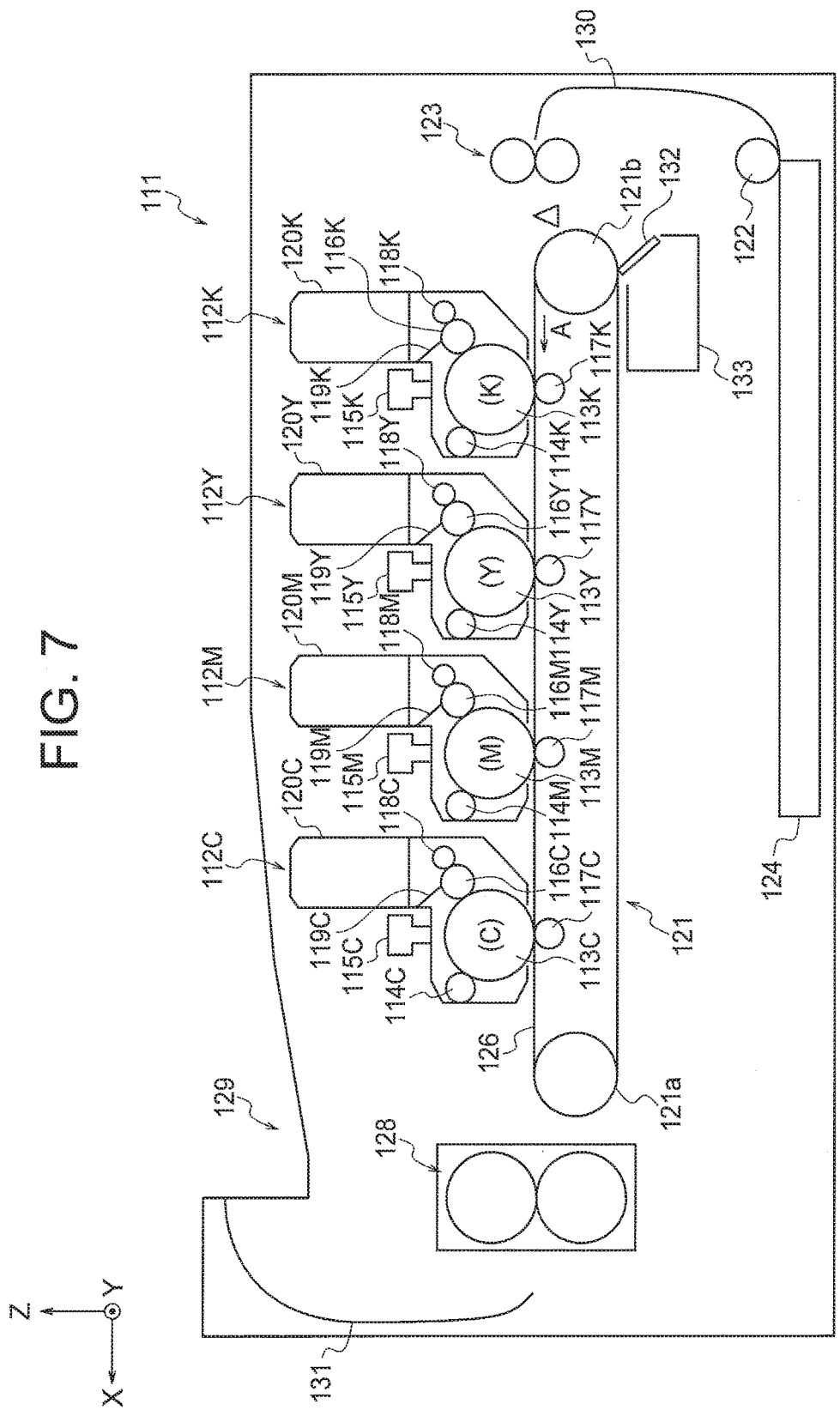
FIG. 7 is a schematic view showing a configuration of an image forming apparatus according to Embodiment 2 of the present invention.

FIG. 7 is a schematic view showing an image forming apparatus 111 according to Embodiment 2 of the present invention.

The image forming apparatus 111 is configured as, for example, an electrophotographic color printer. The image forming apparatus 111 includes four image forming units 112K, 112Y, 112M and 112C (collectively referred to as "image forming units 112") which are arranged from upstream to downstream along a conveying direction (shown by an arrow A) of a recording sheet 130 as a recording medium. The image forming unit 112K forms an image of black (K), the image forming unit 112Y forms an image of yellow (Y), the image forming unit 112M forms an image of magenta (M), and the image forming unit 112C forms an image of cyan (C). In this regard, the recording medium is not limited to the recording sheet 130, but may be an OHP paper, an envelope, a copy paper, a special paper and the like.

The image forming unit 112K includes a photosensitive drum 113K (i.e., an image bearing body), a charging roller 114K (i.e., a charging member), a developing roller 116K (i.e., a developer bearing body), and a toner supplying roller 118K (i.e., a developer supplying member). The charging roller 114K uniformly charges the surface of the photosensitive drum 113K. The developing roller 116K develops an electrostatic latent image formed on the photosensitive drum 113K using a toner (i.e., a developer) to form a toner image. The toner supplying roller 118K is provided so as to contact the developing roller 116K. Similarly, the image forming unit 112Y includes a photosensitive drum 113Y, a charging roller 114Y, a developing roller 116Y, and a toner supplying roller 118Y. The image forming unit 112M includes a photosensitive drum 113M, a charging roller 114M, a developing roller 116M, and a toner supplying roller 118M. The image forming unit 112C includes a photosensitive drum 113C, a charging roller 114C, a developing roller 116C, and a toner supplying roller 118C.

Toner cartridges 120K, 120Y, 120M and 120C (collectively referred to as "toner cartridges 120") are detachably mounted to main bodies of the image forming units 112. The toner supplying rollers 118K, 118Y, 118M and 118C (collectively referred to as "toner supplying rollers 118") supply toners of respective colors replenished by the toner cartridges 120K, 120Y, 120M and 120C to the developing rollers 116K, 116Y, 116M and 116C (collectively referred to as "developing rollers 116"). Developing blades 119K, 119Y, 119M and 119C (collectively referred to as "developing blades 119") are pressed against the developing roller 116K, 116Y, 116M and 116C. The developing blades 119 regulate thicknesses of layers of the toners (supplied by the toner supplying rollers 118) on the surfaces of the developing rollers 116. Although the toner cartridges 120 are detachably mounted to the main bodies of the image forming unit 112, the toner cartridges 120 may also be formed integrally with the main bodies of the image forming units 112.

LED heads 115K, 115Y, 115M and 115C (collectively referred to as "LED heads 115") are provided above the photosensitive drums 113K, 113Y, 113M and 113C of the image forming units 112K, 112Y, 112M and 112C. The LED heads 115K, 115Y, 115M and 115C are disposed so as to face the photosensitive drums 113K, 113Y, 113M and 113C. Each LED head 115 emits light to expose the surface of the photosensitive drum 113 according to image data of a corresponding color to form an electrostatic latent image. The exposure device 10 described in Embodiment 1 is employed as the LED head 115.

A transfer unit 121 is provided below the image forming units 112K, 112Y, 112M and 112C. The transfer unit 121 includes transfer rollers 117K, 117Y, 117M and 117C (collectively referred to as "transfer rollers 117"), a driving roller 121a, a driven roller 121b, and a transfer belt 126. The transfer belt 126 is stretched around the driving roller 121a and the driven roller 121b. A rotation of the driving roller 121a causes the transfer belt 126 to move in a direction shown by the arrow A. The transfer rollers 117K, 117Y, 117M and 117C are pressed against the photosensitive drums 113K, 113Y, 113M and 113C via the transfer belt 126 to form nip portions. The recording sheet 130 passes through nip portions. The transfer rollers 117 charge the recording sheet 130 to a polarity opposite to the toner, so as to transfer the toner images from the respective photosensitive drums 113 to the recording sheet 130, A sheet feeding mechanism is provided at a lower part of the image forming apparatus 111. The sheet feeding mechanism is configured to feed the recording sheet 130 to the image forming units 112 and the transfer unit 121. The sheet feeding mechanism includes a hopping roller 122, a pair of registration rollers 123, and a sheet cassette 124.

A fixing unit 128 is disposed downstream of the transfer belt 126 in the conveying direction of the recording sheet 130. The fixing unit 128 includes a heat roller and a backup roller. The fixing unit 128 is configured to heat and press the toner (transferred onto the recording sheet 130) to fix the toner to the recording sheet 130. Further, ejection rollers (not shown) are disposed along a sheet guide 131 disposed downstream of the fixing unit 128 in the conveying direction of the recording sheet 130. A sheet stacker portion 129 is provided on a top cover of the image forming apparatus 111.

A printing operation of the image forming apparatus 111 configured as above will be described. First, the hopping roller 122 feeds the recording sheet 130 out of the sheet cassette 124. The registration rollers 123 correct a skew of the recording sheet 130, and convey the recording sheet 130 to the transfer belt 126. The transfer belt 126 conveys the recording sheet 130 through the image forming units 112K, 112Y, 112M and 112C.

In the image forming units 112, the charging rollers 114K, 114Y, 114M and 114C (collectively referred to as "charging rollers 114") uniformly charge the surfaces of the photosensitive drums 113, and the LED heads 115 expose the surfaces of the photosensitive drums 113 to form electrostatic latent images. The developing rollers 116 develop the latent images by causing the toners to electrostatically adhere to the latent images, and form toner images of respective colors. The transfer rollers 117 transfer the toner images of respective colors from the photosensitive drums 113 to the recording sheet 130 on the transfer belt 126, and a color image is formed on the recording sheet 130. The toners remaining on the surface of the photosensitive drums 113 after transferring of the toner images are removed by not shown cleaning members.

The recording sheet 130 with the transferred color toner image is conveyed to the fixing unit 128. The fixing unit 128 fixes the color toner image to the recording sheet 130. Then, the recording sheet with the fixed toner image is conveyed by the ejection rollers along the sheet guide 131, and is ejected onto the sheet stacker portion 129. With such a process, the color image is formed on the recording sheet 130. In this regard, the toner (i.e., a residual toner) adhering to the transfer belt 126 is scraped off by a belt cleaning blade 132, and is stored in a belt cleaning container 133.

In the image forming apparatus 111, the exposure device 10 described in Embodiment 1 is employed as the LED head 115. Therefore, generation of a vertical stripe in a printed image can be suppressed, and printing quality can be enhanced.

Embodiment 3.

Figure 8:
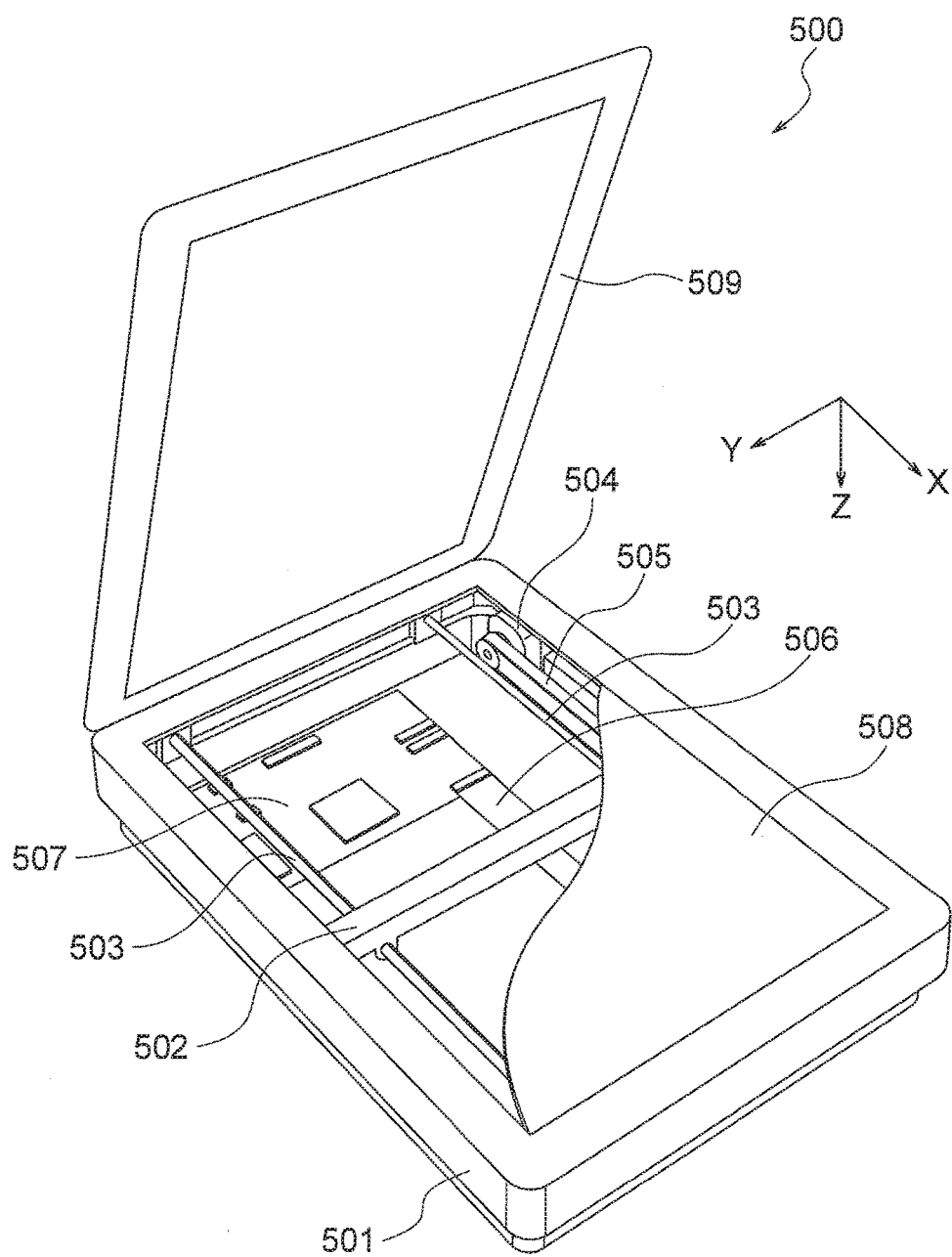
FIG. 8 is a perspective view showing a configuration of an image reading apparatus according to Embodiment 3 of the present invention.

FIG. 8 is a perspective view showing an image reading apparatus 500 according to Embodiment 3 of the present invention. In FIG. 8, a document table 508 is partially cut away, in order to show an internal configuration of the image reading apparatus 500.

The image reading apparatus 500 shown in FIG. 8 is of a flatbed type. The image reading apparatus 500 includes a housing 501, a contact image sensor (CIS) head 502, a pair of guides 503, a stepping motor 504, a driving belt 505, a flexible flat cable 506, a control circuit 507, a document table 508, and a lid 509.

The document table 508 is provided on top of the housing 501. The lid 509 is configured to cover a document (i.e., an original) placed on an upper surface (i.e., a placing surface) of the document table 508. The guides 503 are disposed inside the housing 501, and extend parallel to each other. The contact image sensor head 502 is guided by the guides 503 so as to be slidable in the X-axis direction (i.e., a sub-scanning direction) along the document table 508.

Figure 9:
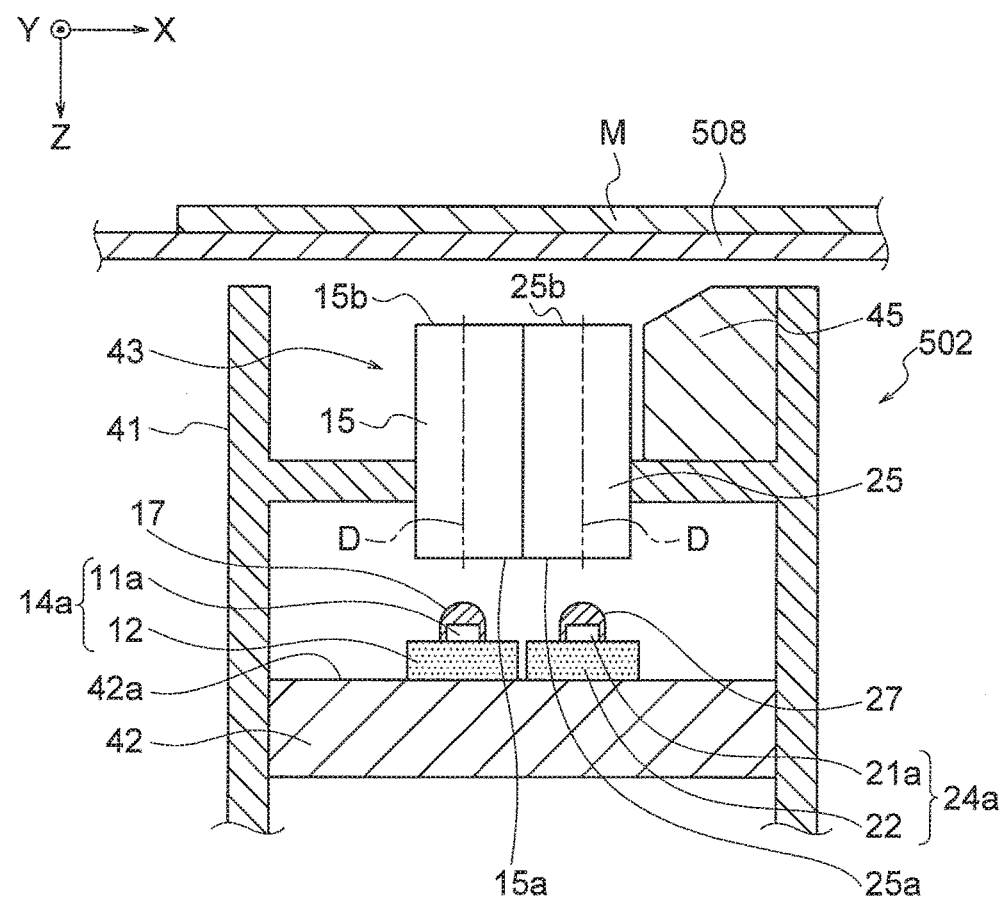
FIG. 9 is a schematic view showing a configuration of a contact image sensor of the image reading apparatus.

FIG. 9 is a schematic view showing a configuration example of the contact image sensor head 502. The contact image sensor head 502 has substantially the same configuration as the exposure device 10 except that the contact image sensor head 502 includes light receiving element array substrates 14a and 24a instead of the LED array substrates 14 and 24 of the exposure device 10. The light receiving element array substrates 14a and 24a respectively include light receiving element arrays 11a and 21a. The light receiving element arrays 11a and 21a include light receiving elements which are arranged in the same manner as the LEDs 31 of the LED arrays 11 and 21 (FIG. 3). The contact image sensor head 502 further includes a light-guiding body 45 that guides light emitted from a light source (not shown) and emits the light toward the document M. The light receiving element arrays 11a and 21a receive light reflected from the document M and focused by the first and second rod lens arrays 15 and 25. In this regard, the configuration of the contact image sensor head 502 is not limited to that shown in FIG. 9.

As shown in FIG. 8, the contact image sensor head 502 is connected to the driving belt 505 driven by the stepping motor 504 in order to move the contact image sensor head 502 in the sub-scanning direction (i.e., the X-direction) along the guides 503. The control circuit 507 controlling the contact image sensor head 502 is electrically connected to the contact image sensor head 502 via the flexible flat cable 506.

In the image reading apparatus 500, the contact image sensor head 502 slides in the sub-scanning direction (i.e., the X-axis direction) and reads the document M placed on the placing surface of the document table 508 using the light receiving element arrays 11a and 21a (FIG. 9) arranged in the main scanning direction (i.e., the Y-axis direction).

As described above, the image reading apparatus 500 includes the contact image sensor head 502 having substantially the same configuration as the exposure device 10 described in Embodiment 1, generation of a vertical stripe in a read image can be suppressed, and reading quality can be enhanced.

In the above description, the present invention is employed in the image reading apparatus or the image forming apparatus (for example, the electrophotographic color printer). However, the present invention is also applicable to an MFT (Multi-Function Peripheral), a facsimile machine, a copier or the like.

While the preferred embodiments of the present invention have been illustrated in detail, it should be apparent that modifications and improvements may be made to the invention without departing from the spirit and scope of the invention as described in the following claims.

What is claimed is:

1. An exposure device, comprising:
   a first light emitting element substrate including a plurality of first light emitting elements arranged at an arrangement interval T in a longitudinal direction of the first light emitting element substrate; and
   a second light emitting element substrate including a part in the longitudinal direction that overlaps with a part of the first light emitting element substrate so as to form an overlapping region,
   wherein the first light emitting element substrate and the second light emitting element substrate are shifted from each other in a direction perpendicular to the longitudinal direction;
   wherein the second light emitting element substrate includes a plurality of second light emitting elements arranged in the longitudinal direction, the second light emitting elements being arranged at the arrangement interval T at least outside the overlapping region; and
   wherein when an interval between two of the second light emitting elements of the second light emitting element substrate disposed in the overlapping region is expressed as a specified interval TS, the specified interval TS and the arrangement interval T satisfy the following relationship:

$T \le TS \le 2T$, wherein a displacement amount $\Delta T$ is defined by $\Delta T = TS - T$, and the displacement amount $\Delta T$ is smaller than or equal to 10 μm.

2. The exposure device according to claim 1, wherein the specified interval TS and the arrangement interval T further satisfy:

$T + T/3 \le TS \le T + 2 \times T/3$.

3. The exposure device according to claim 1, wherein the first light emitting element substrate further includes a first light emitting element array on which the first light emitting elements are arranged, wherein the second light emitting element substrate further includes a second light emitting element array on which the second light emitting elements are arranged.

4. The exposure device according to claim 1, wherein the arrangement interval T is an average of intervals at which the first light emitting elements of the first light emitting element substrate are arranged.

5. An image forming apparatus comprising the exposure device according to claim 1.

6. An LED head as the exposure device according to claim 1,
wherein the first light emitting elements and the second light emitting elements are formed of LEDs.

7. An exposure device, comprising:
a first light emitting element substrate including a plurality of first light emitting elements arranged at an arrangement interval T in a longitudinal direction of the first light emitting element substrate;
a second light emitting element substrate including a part in the longitudinal direction that overlaps with a part of the first light emitting element substrate so as to form an overlapping region; and
a base on which the first light emitting element substrate and the second light emitting element substrate are placed;
wherein the first light emitting element substrate and the second light emitting element substrate are shifted from each other in a direction perpendicular to the longitudinal direction;
wherein the second light emitting element substrate includes a plurality of second light emitting elements arranged in the longitudinal direction, the second light emitting elements being arranged at the arrangement interval T at least outside the overlapping region;
wherein when an interval between two of the second light emitting elements of the second light emitting element substrate disposed in the overlapping region is expressed as a specified interval TS, the specified interval TS and the arrangement interval T satisfy the following relationship:

$T \leq TS \leq 2T$, wherein the first light emitting element substrate has a fixed end portion fixed to the base, and a movable end portion movably placed on the base;
wherein the second light emitting element substrate has a fixed end portion fixed to the base, and a movable end portion movably placed on the base; and
wherein the movable end portion of the first light emitting element substrate and the fixed end portion of the second light emitting element substrate are located in the overlapping region.

8. An image forming apparatus comprising the exposure device according to claim 7.

9. An LED head as the exposure device according claim 7,
wherein the first light emitting elements and the second light emitting elements are formed of LEDs.

10. An exposure device, comprising:
a first light emitting element substrate including a plurality of first light emitting elements arranged at an arrangement interval T in a longitudinal direction of the first light emitting element substrate; and
a second light emitting element substrate including a part in the longitudinal direction that overlaps with a part of the first light emitting element substrate so as to form an overlapping region,
wherein the first light emitting element substrate and the second light emitting element substrate are shifted from each other in a direction perpendicular to the longitudinal direction;
wherein the second light emitting element substrate includes a plurality of second light emitting elements arranged in the longitudinal direction, the second light emitting elements being arranged at the arrangement interval T at least outside the overlapping region;
wherein when an interval between two of the second light emitting elements of the second light emitting element substrate disposed in the overlapping region is expressed as a specified interval TS, the specified interval TS and the arrangement interval T satisfy the following relationship:

$T \leq TS \leq 2T$; and wherein the light emission is switched between the first light emitting element of the first light emitting element substrate disposed in the overlapping region and the second light emitting element of the second light emitting element substrate disposed in the overlapping region.

11. An image forming apparatus comprising the exposure device according to claim 10.

12. An LED head as the exposure device according claim 10,
wherein the first light emitting elements and the second light emitting elements are formed of LEDs.

13. An image reading apparatus, comprising:
a first light receiving element substrate including a plurality of first light receiving elements arranged at an arrangement interval T in a longitudinal direction of the first light receiving element substrate; and
a second light receiving element substrate including a part in the longitudinal direction that overlaps with a part of the first light receiving element substrate so as to form an overlapping region,
wherein the first light receiving element substrate and the second light receiving element substrate are shifted from each other in a direction perpendicular to the longitudinal direction;
wherein the second light receiving element substrate includes a plurality of second light receiving elements arranged in the longitudinal direction, the second light receiving elements being arranged at the arrangement interval T at least outside the overlapping region;
wherein when an interval between two of the second light receiving elements of the second light receiving element substrate disposed in the overlapping region is expressed as a specified interval TS, the specified interval TS and the arrangement interval T satisfy the following relationship:

$T \leq TS \leq 2T$; and wherein a displacement amount ΔT is defined by ΔT=TS−T, and the displacement amount ΔT is smaller than or equal to 10 μm.

14. An image reading apparatus, comprising:
a first light receiving element substrate including a plurality of first light receiving elements arranged at an arrangement interval T in a longitudinal direction of the first light receiving element substrate;
a second light receiving element substrate including a part in the longitudinal direction that overlaps with a part of the first light receiving element substrate so as to form an overlapping region; and a base on which the first light receiving element substrate and the second light receiving element substrate are placed;

wherein the first light receiving element substrate and the second light receiving element substrate are shifted from each other in a direction perpendicular to the longitudinal direction;

wherein the second light receiving element substrate includes a plurality of second light receiving elements arranged in the longitudinal direction, the second light receiving elements being arranged at the arrangement interval T at least outside the overlapping region;

wherein when an interval between two of the second light receiving elements of the second light receiving element substrate disposed in the overlapping region is expressed as a specified interval TS, the specified interval TS and the arrangement interval T satisfy the following relationship:

$T \leq TS \leq 2T$, wherein the first light receiving element substrate has a fixed end portion fixed to the base, and a movable end portion movably placed on the base;

wherein the second light receiving element substrate has a fixed end portion fixed to the base, and a movable end portion movably placed on the base; and wherein the movable end portion of the first light receiving element substrate and the fixed end portion of the second light receiving element substrate are located in the overlapping region.

15. An image reading apparatus, comprising:

a first light receiving element substrate including a plurality of first light receiving elements arranged at an arrangement interval T in a longitudinal direction of the first light receiving element substrate; and a second light receiving element substrate including a part in the longitudinal direction that overlaps with a part of the first light receiving element substrate so as to form an overlapping region, wherein the first light receiving element substrate and the second light receiving element substrate are shifted from each other in a direction perpendicular to the longitudinal direction;

wherein the second light receiving element substrate includes a plurality of second light receiving elements arranged in the longitudinal direction, the second light receiving elements being arranged at the arrangement interval T at least outside the overlapping region;

wherein when an interval between two of the second light receiving elements of the second light receiving element substrate disposed in the overlapping region is expressed as a specified interval TS, the specified interval TS and the arrangement interval T satisfy the following relationship:

$T \leq TS \leq 2T$; and wherein the light emission is switched between the first light receiving element of the first light receiving element substrate disposed in the overlapping region and the second light receiving element of the second light receiving element substrate disposed in the overlapping region.

* * * * *